Patented Nov. 4, 1930

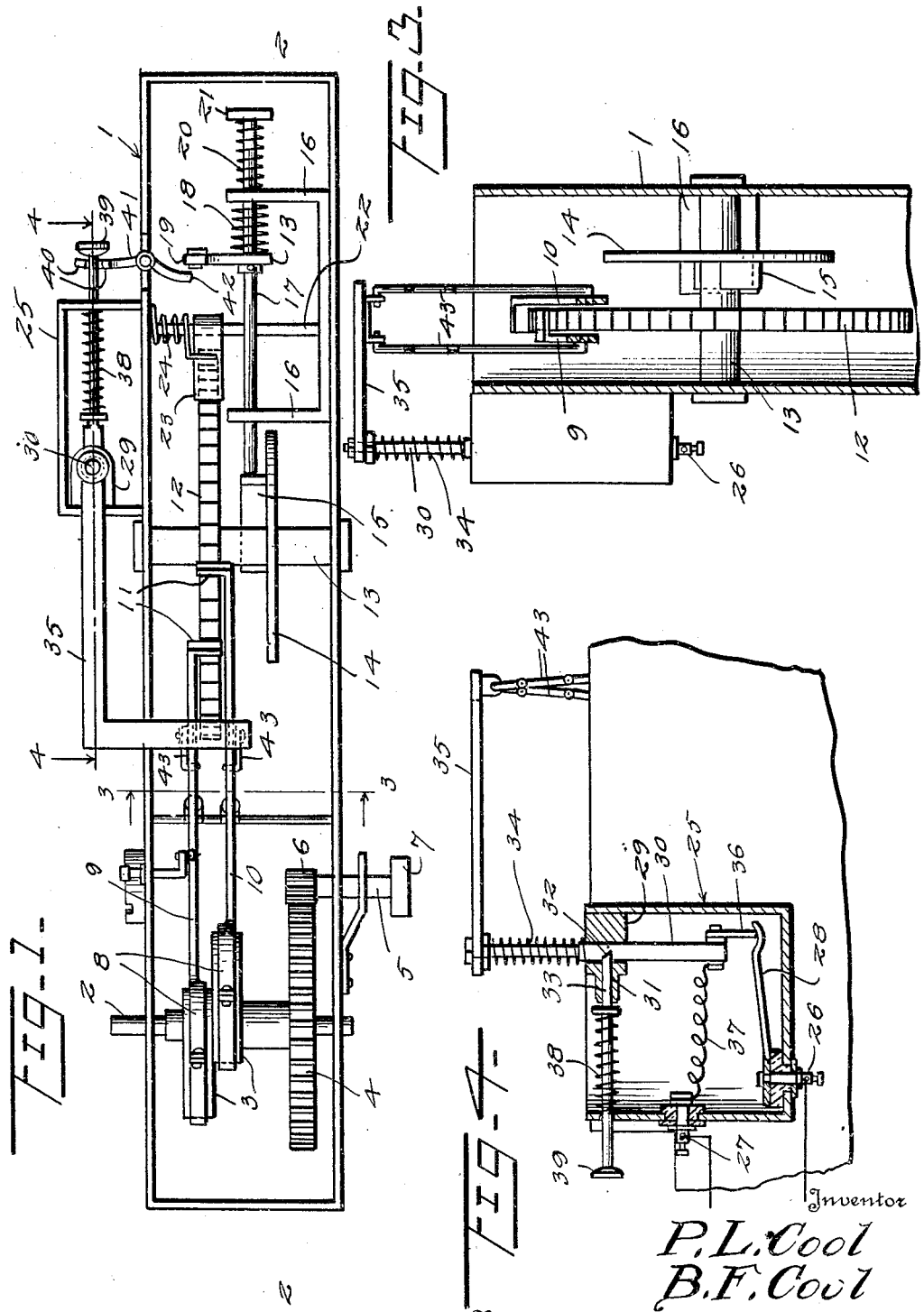

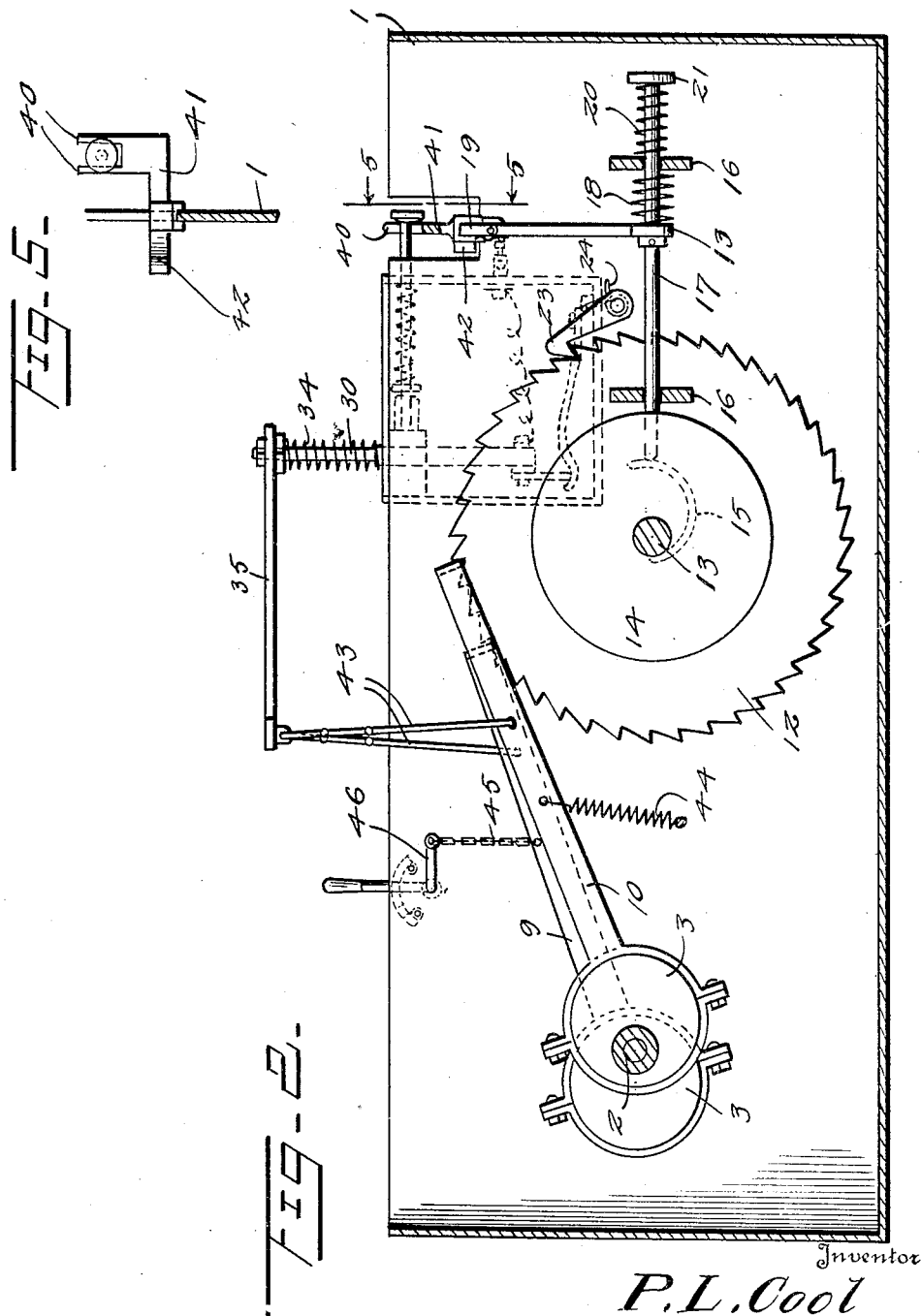

1,780,377

UNITED STATES PATENT OFFICE

PAUL L. COOL AND BUOL F. COOL, OF COUNCIL BLUFFS, IOWA, ASSIGNORS OF FIFTY-TWO PER CENT TO HOWARD McDANIEL, OF COUNCIL BLUFFS, IOWA

TIMER FOR CREAM TESTERS

Application filed October 18, 1929. Serial No. 400,680.

This invention relates to timing devices designed primarily for use in connection with cream testers.

At the present time cream testers are run for periods of two and four minutes, testing devices being stopped for a certain period of time between these two operating periods. This, of course, requires the attention of an attendant at all times to see that the first and second periods are correctly timed.

The present invention has for its primary object to provide a device adapted to be connected with the drive shaft of a tester and to be so set that after the testing device has run for the desired length of time it will be automatically stopped by the device. In this manner the testing process may be accurately carried out.

The invention broadly contemplates the provision of a shaft carrying a pair of cams with means for connecting this shaft with the drive shaft of the cream tester. Associated with the cam carrying driven shaft is a ratchet wheel and connecting the cams with the ratchet wheel is a pair of arms each of which carries a cam strap and has a turned free end adapted to operate the ratchet wheel. These free ends of the arms when in connection with the ratchet wheel turn the same for a period of approximately two minutes for the completion of one revolution, when the driven shaft is connected to the drive shaft of a tester which rotates at a speed of approximately eighty revolutions a minute, following which a trip mechanism is permitted to operate and to stop the operation of the tester.

The two cams of the mechanism are spaced at approximately one hundred eighty degrees apart and when one thereof is employed for the operation of the ratchet wheel a period of four minutes is required to complete a revolution thereof.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 shows the mechanism embodying the present invention, in top plan.

Figure 2 is a longitudinal sectional view taken upon the line 2—2 of Figure 1.

Figure 3 is a transverse sectional view taken upon the line 3—3 of Figure 1.

Figure 4 is a sectional view taken upon the line 4—4 of Figure 1.

Figure 5 is a sectional view taken upon the line 5—5 of Figure 2.

Referring more particularly to the drawings, the numeral 1 indicates a suitable frame or casing for the mechanism embodying the present invention which casing is of elongated rectangular formation, as shown in Figure 1.

Adjacent one end of the casing there is mounted transversely thereof a shaft 2 which carries a pair of eccentric disks 3. This shaft also has keyed thereto a gear 4.

Mounted in suitable bearings adjacent the gear 4 and in the adjacent wall of the casing is a stub shaft 5 having upon its inner end a gear pinion 6 and upon its outer end a friction wheel 7. As shown, the pinion 6 is in mesh with the gear 4. The friction wheel 7 is adapted to be positioned in contact with the driving shaft of a cream tester so that the motion of the tester drive shaft will be imparted thereto and to the shaft 2.

Each of the eccentric disks 3 has secured thereabout an eccentric strap 8, these straps carrying arms 9 and 10. The disks 3, as shown, are mounted upon the shaft so that the high points thereof will be diametrically opposite or one hundred eighty degrees apart so that when one of the arms is at the limit of its forward movement the other will be at the limit of its rearward or retracted movement. The forward end of each of the arms 9 and 10 is turned laterally to provide a finger 11 and these fingers normally bear against and engage the teeth of a ratchet wheel 12 mounted within the casing upon a transverse shaft 13. The teeth of the ratchet wheel 12 are so directed that when the arms 9 and 10 move toward the wheel they will be engaged and rotary movement imparted to the wheel.

The shaft 13 which carries the ratchet wheel 12 also carries a disk 14 upon one face of which is secured a half cam 15.

Mounted for reciprocable movement within the casing between a pair of bracket arms 16 is a beam member 17, one end of which is directed toward the shaft 13 and so positioned that when the shaft is rotated the cam 15 will bear thereagainst to move the pin longitudinally. This movement of the pin away from the shaft 13 by the cam 15 is normally opposed by a spring 18 surrounding the pin and interposed between the forward bracket member 16 and an arm 19 secured to and projecting from the pin 17 in the manner shown. It will be seen that after the cam has rotated to the point where the end of the pin 17 will be released the spring 18 will recoil and force the pin 17 rearwardly toward the shaft 13. The violence of this recoil is lessened by positioning a recoil spring 20 about the outer end of the pin 17 between the bracket against which the spring 18 bears and a head 21 upon the adjacent end of the pin.

Mounted upon suitable transverse pin 22 forwardly of the ratchet wheel 12 is a pawl 23 maintained in contact with the ratchet 24 to prevent accidental reverse movement of the ratchet wheel when only the arm 10 is employed for operating the wheel and this arm happens to be in raised position as hereinafter described.

Mounted upon one side of the casing 1 is a switch, indicated as a whole by the numeral 25, which has a pair of terminals associated therewith, as indicated at 26 and 27, one of these terminals, as for example the terminal 26, being connected with a resilient contact tongue 28 within the switch body, as shown in Figure 4.

Within the switch body is a guide block 29 through which a vertically reciprocating pin 20 passes, this guide block having a laterally opening passage 21 into which extends the pointed end 32 of a horizontally reciprocating trip pin 33. The pointed inner end of this trip pin 33 is adapted to engage in a suitable notch in the vertical pin 30 to maintain the pin in down position against the tension of the spring 34 which surrounds its upper end and bears at one end against the block 29 and at its other end against the underside of an arm 35 secured to the upper end of the pin 30, in the manner shown in Figure 4.

The lower end of the pin 30 carries a metal contact member 36 which is in electrical connection, by means of the resilient conductor 37, with the terminal 27. When the pin 30 is moved downwardly against the tension of the spring 34 this contact member 36 engages the spring contact tongue 28 to complete an electrical circuit controlling the testing device in association with which the present timer is to be used.

The horizontal reciprocating pin 33 has normally urging it inwardly for engagement with the pin 30, a spring 38 which is interposed between a wall of the switch 25 and a suitable band or stop carried by the pin. Upon its outer end the pin 33 has a head 39 which engages the forks 40 of a trigger member 41 pivotally mounted upon a suitable support in a recess in the wall of the casing 1 adjacent the arm 19. As shown in Figure 5, the pin 33 adjacent the head 39 positions in the forked end of this trigger. The other end 42 of the trigger 41 extends into the casing to a position where it will be engaged by the arm 19 when the cam 15 releases the pin 17 in the manner described so that the spring 18 will drive the arms against the trigger.

The other end of the arm 35 is turned to extend inwardly to a position over the arms 9 and 10 and is connected by means of suitable flexible connectors 43 with the arms 9 and 10. Each of these arms 9 and 10 is normally held down in contacting relation with the ratchet wheel 12 by springs 44 and one thereof, as for example the arm 9, is connected by means of the element 45 with a crank 46 pivotally mounted upon the casing and adapted to be secured in a shifted position so that the arm 9 will be raised from contact with the ratchet wheel 12 to permit only the arm 10 to operate upon the ratchet wheel.

In the operation of the present timing mechanism the friction wheel 7 is held securely against the drive shaft of a testing device so that the rotary motion of the tester will be imparted to the shaft 2 and will cause the arms 9 and 10 to reciprocate over and in engagement with the ratchet wheel 12. With both arms engaging the ratchet wheel, the mechanism is so timed that approximately two minutes is consumed in completing one revolution of the wheel and it will be seen that when the mechanism is set so that the pin 17 is engaged at its inner end with the lower portion of the cam 15, after completion of one revolution the pin will be allowed to slip off of the cam to move from the position into which it has been placed thereby and to bring the arm 19 into sharp contact with the inner end of the trigger 41. This action will retract the pin 33, disengaging it from the pin 30 and allowing the control spring of the pin 30 to shift this pin upwardly so that the members 28 and 36 will be disengaged thus breaking the electric circuit controlling the testing mechanism. At the same time that the pin 30 is raised by the pin 34, the arm 35 will be raised and will lift the arms 9 and 10 free from contact with the ratchet wheel 12.

When it is wished to operate the timing mechanism for four minutes the crank 46 is swung over so that the arm 9 will be raised and only the arm 10 permitted to actuate the ratchet wheel. It is obvious that with only one arm moving the ratchet wheel it will take twice as long for the wheel to be turned through one revolution.

From the foregoing description it will be readily understood that with the use of this device an attendant upon the testing machine is unnecessary while the same is operating for after the required length of time is passed this mechanism will automatically stop the tester.

Having thus described our invention, what we claim is:—

1. A timer for a mechanism of the character described employing a rotating shaft, comprising an eccentric mechanism, means for coupling said mechanism with said shaft for unitary operation therewith, a trip mechanism, a step by step operating element actuated by said eccentrics and operating said trip after a predetermined period, and means controlled by the trip adapted to interrupt the operation of said shaft.

2. A timing mechanism for a cream tester employing a rotating shaft, comprising a ratchet wheel, a cam operated thereby, means adapted to control the operation of the tester, a trip element actuated by said cam after a predetermined period of operation of said ratchet for operating said control means, and means for coupling said ratchet wheel with the tester shaft to cause the same to operate in unison.

3. A timing mechanism for cream testers having a rotating operating shaft comprising a ratchet wheel, means for controlling the operation of the tester, a cam member rotating in unison with the ratchet wheel, means operated by the cam after a predetermined period of rotation for actuating the tester control means, reciprocating arm members operating upon the ratchet wheel to give step by step movement thereto, and means for connecting the arm members with the tester drive shaft to cause the arms to be actuated thereby.

4. A timing mechanism for cream testers having a rotating operating shaft comprising a ratchet wheel, means for controlling the operation of the tester, a cam member rotating in unison with the ratchet wheel, means operated by the cam after a predetermined period of rotation for actuating the tester control means, reciprocating arm members operating upon the ratchet wheel to give step by step movement thereto, means for connecting the arm members with the tester drive shaft to cause the arms to be actuated thereby, and means for disengaging said arms from the ratchet wheel upon the actuation of said trip.

5. A timing mechanism for cream testers having a rotating operating shaft comprising a ratchet wheel, means for controlling the operation of the tester, a cam member rotating in unison with the ratchet wheel, means operated by the cam after a predetermined period of rotation for actuating the tester control means, reciprocating arm members operating upon the ratchet wheel to give step by step movement thereto, means for connecting the arm members with the tester drive shaft to cause the arms to be actuated thereby, and means for reducing the speed of rotation of said ratchet wheel.

6. A timing mechanism for cream testers having a rotating operating shaft comprising a ratchet wheel, means for controlling the operation of the tester, a cam member rotating in unison with the ratchet wheel, means operated by the cam after a predetermined period of rotation for actuating the tester control means, reciprocating arm members operating upon the ratchet wheel to give step by step movement thereto, means for connecting the arm members with the tester drive shaft to cause the arms to be actuated thereby, and means for disengaging one of said arms from said ratchet wheel for reducing the speed of operation of the wheel.

7. A timing device for cream testers comprising a pair of eccentrics, reciprocable arms operated by said eccentrics, means for operating said eccentrics in unison with a tester shaft, a switch mechanism for controlling the operation of the tester, a ratchet wheel engaged and intermittently operated by said arms, a reciprocable pin member, a cam operated against one end of said pin and moving in unison with the ratchet wheel, resilient means opposing the movement of the pin, and means actuated by said pin upon its release by the cam for opening said switch.

8. A timing device for cream testers comprising a pair of eccentrics, reciprocable arms operated by said eccentrics, means for operating said eccentrics in unison with a tester shaft, a switch mechanism for controlling the operation of the tester, a ratchet wheel engaged and intermittently operated by said arms, a reciprocable pin member, a cam operated against one end of said pin and moving in unison with the ratchet wheel, resilient means opposing the movement of the pin, and means operating simultaneously with the opening of the switch for disengaging said arms from the ratchet wheel.

9. A cream tester timing mechanism comprising a shaft, a pair of eccentric bodies mounted thereon, a pair of reciprocating arms each connected to and operated by an eccentric, means for coupling said shaft with a rotating element of the tester, a switch member including a spring controlled horizontally reciprocating pin and a spring operating vertically reciprocating pin normally held in operative position by the first mentioned pin, a ratchet wheel having the teeth thereof engaged by said arms, a reciprocating trip pin having a control spring normally urging it in one direction, a cam operated in unison with the ratchet wheel, and adapted to shift the trip pin in opposition to its control spring, and a trigger element connected with said horizontal pin and adapted to be actuated by said trip pin when released by said cam to permit the movement of the vertically reciprocating pin normally held in switch closed position by the horizontal pin.

10. A cream tester timing mechanism comprising a shaft, a pair of eccentric bodies mounted thereon, a pair of reciprocating arms each connected to and operated by an eccentric, means for coupling said shaft with a rotating element of the tester, a switch member including a spring controlled horizontally reciprocating pin and a spring operating vertically reciprocating pin normally held in operative position by the first mentioned pin, a ratchet wheel having the teeth thereof engaged by said arms, a reciprocating trip pin having a control spring normally urging it in one direction, a cam operated in unison with the ratchet wheel, and adapted to shift the trip pin in opposition to its control spring, and a trigger element connected with said horizontal pin and adapted to be actuated by said trip pin when released by said cam to permit the movement of the vertically reciprocating pin normally held in switch closed position by the horizontal pin, an arm member carried by said vertical pin and coupling elements between said last arms and the first mentioned arms.

In testimony whereof we hereunto affix our signatures.

PAUL L. COOL.
BUOL F. COOL.